UNITED STATES PATENT OFFICE.

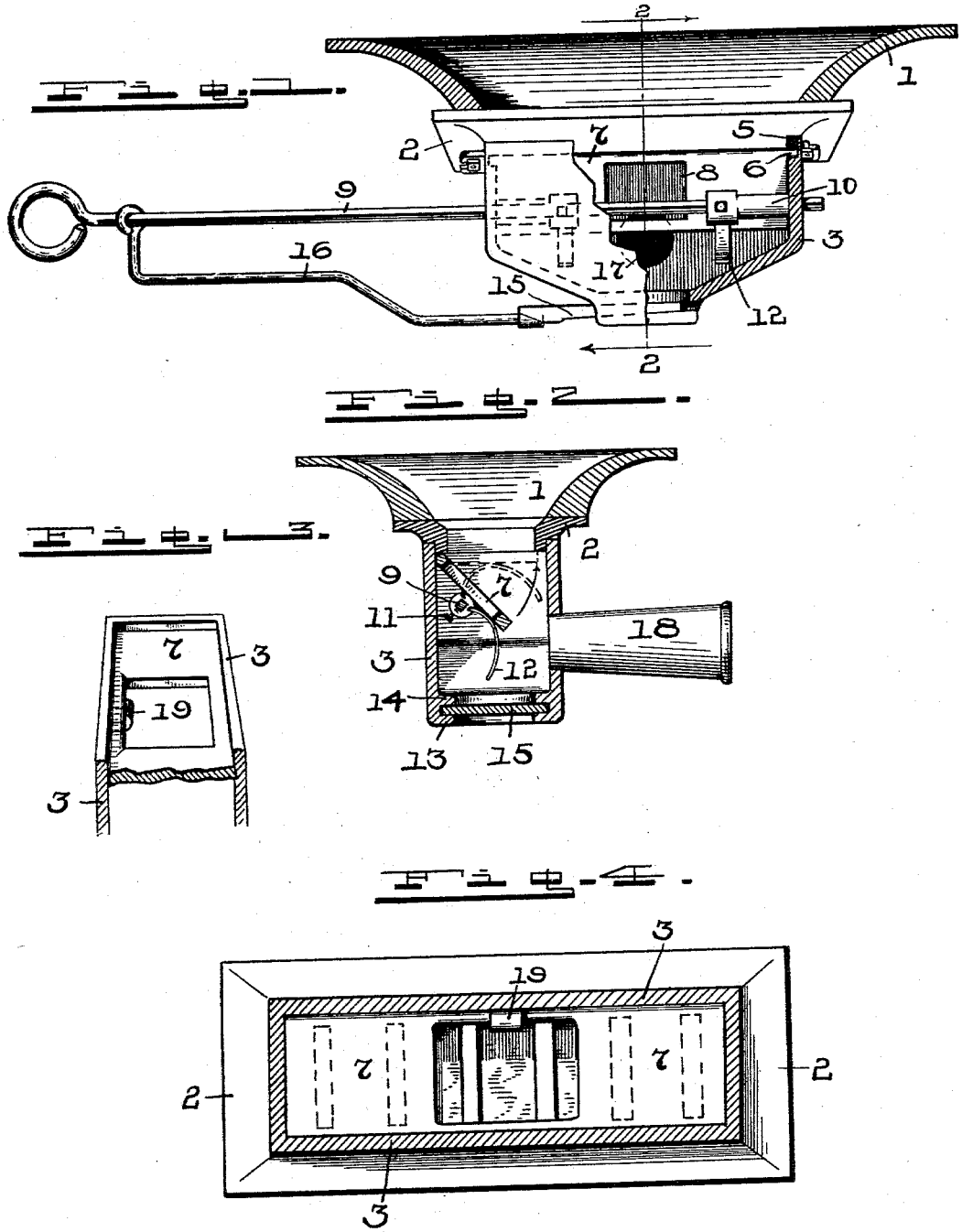

ALBERT R. THOMPSON, OF INDIANAPOLIS, INDIANA.

TWYER-IRON FOR FORGES.

SPECIFICATION forming part of Letters Patent No. 589,761, dated September 7, 1897.

Application filed April 1, 1897. Serial No. 630,232. (No model.)

*To all whom it may concern:*

Be it known that I, ALBERT R. THOMPSON, of Indianapolis, county of Marion, and State of Indiana, have invented a certain new and useful Twyer-Iron for Forges; and I do hereby declare that the following is a full, clear, and exact description thereof, reference being had to the accompanying drawings, in which like figures refer to like parts.

This invention relates to improvements in twyer-irons for forges whereby improved means are afforded for closing the valve or plate beneath the grate, and especially by means of springs to very tightly close such valve when it is desired to concentrate the blast on one portion of the fire.

The other objects of my invention are to simplify and cheapen the cost of the construction and at the same time increase the efficiency and ease of controlling the blast and clearing the box of cinders.

The full nature of my invention will appear from the accompanying drawings and the description and claims following.

In the drawings, Figure 1 is a longitudinal section of my twyer-iron for forges. Fig. 2 is a cross-section thereof on the line 2 2 in Fig. 1. Fig. 3 is a perspective of the upper surface of a portion of the box and valve. Fig. 4 is a section on the line 4 4 of Fig. 2, looking upward.

Upon suitable brickwork or other proper support I place the fire-bed 1, which is shown here to be rectangular, but it may be circular. It flares upward somewhat in the form of an inverted bell. The outer edges rest upon the brick support. To its bottom there is secured a separable grate 2, having grate-bars that extend crosswise of the opening in the grate.

Beneath the grate I secure a blast-box 3 by means of the bolts 4, which are preferably cast solid in the fire-bed and extend through the grate-frame and ears on the blast-box, so that any one of these parts is readily detached. The upper portion of the blast-box 3, as shown, is rectangular, but it may be otherwise formed to suit the form of the grate. In the upper part of the two end walls of the blast-box 3 I cut out a recess 5 to receive the ends of the rod 6 and in which said rod has its bearings. The valve or plate 7 is secured by one of its edges to or around said rod 6. The length and width of the valve or plate 7 are substantially that of the grate, as the purpose of said valve or plate is to close the opening in said grate. An opening 8 is provided in said valve or plate, as seen in Figs. 1, 3, and 4, whose function is to concentrate the blast to some one small portion of the fire when that is desired. It has preferably a central location and may be round or square, as desired. As I show it here it is of sufficient dimensions to confine the blast to only two openings in the grate. When said valve is open, as seen in Figs. 1 and 2, the blast is distributed throughout the whole grate-surface. To close and hold closed said valve, I provide the following means:

I extend a rod 9 longitudinally through the blast-box, so as to be rotatable therein. On it I secure two sleeves 10, one of which is shown plainly in Figs. 1 and 2 and the other is shown in dotted lines in Fig. 1. Said sleeves are held in place by the set-screws 11. The ends of said sleeves abut against the opposite ends of the blast-box, thereby holding the rod 9 so that it can have no longitudinal movement. To said sleeves I secure a cam-shaped flat metallic spring 12. By "cam-shaped" I mean a spring whose degree of curvature decreases from the point of its attachment to its free end. Said spring is attached to the sleeve in the position shown clearly in Fig. 2—that is, with the convex side upward when it is moved into the position shown in dotted lines in Fig. 2. The rotatable rod 9 is mounted, preferably, to one side of the center of the blast-box on the same side in which the valve-rod 6 is located, as seen in Fig. 2. Said rod 9 is also located only far enough below the top of the box to permit the spring 12, when the rod 9 is rotated from the position shown in plain lines in Fig. 2, to engage, elevate, and close the valve or plate 7. Said spring, too, will also, after it has closed the valve or plate by virtue of said rotation of the rod 9, press upward strongly against said plate, whereby a close and practically air-tight joint is made between the valve and grate. The virtue of the cam-shaped spring is that it operates regardless of slight variations in the location of parts and regardless of the subsequent wear of the parts and relaxation or weakening of the spring, because the farther the rod 9 is rotated the harder it will press up against the valve. The friction between the spring and valve is sufficient to hold the spring in its upward position, so that the valve will not open until the rod 9 is rotated backward.

The blast-box 3 is preferably tapered at its lower end, as shown—that is, the two end portions of the body being inclined downwardly somewhat toward the center. The central part of the bottom of the blast-box is open. Along the inner edges of its two sides I provide a guideway by turning said edges inward to make a flange 13, and I provide a pair of parallel flanges 14 above. Between these two flanges 13 and 14 I slide the bottom or sliding plate 15 in to close the opening in the bottom of the box. The purpose of this opening is to remove cinders that fall into the draft-box. It is desirable that the sliding plate 15 make a very close joint to prevent the escape of the air when said opening in the bottom of the box is closed. To do this, I make the inner end of the plate 15 somewhat thinner than the outer end of it. In other words, I taper it slightly in thickness, as shown in Fig. 1. By this means it is obvious that the farther in said plate 15 is pushed the tighter will be the joint between it and the flanges 13 and 14 in the bottom of the draft-box. This sliding plate is operated by the handle 16, that at one end is secured to said sliding plate and at the other end loops preferably over the outer end of the rod 9, as shown in Fig. 1.

In one side of the blast-box 3 there is a blast-inlet 17 through the nozzle 18.

In Figs. 3 and 4 I show modified means for supporting or hinging the valve or plate 7. Instead of supporting or pivoting it at its two ends I have supported and pivoted it centrally on the hooked lug 19, cast with one side of the blast-box.

From the foregoing description it is seen that I have an economical and simple construction which is made in separable parts, so that any of the parts, if worn out, can be removed and a new part substituted. The further object in making the fire-bed and the grate separable is that some purchasers do not care for the fire-bed, and therefore with my arrangement it can be detached and the remainder sold to him; but if the purchaser desires a fire-bed the device as a whole can be supplied him, or if he desires to add a fire-bed to the twyer-iron he already has the same can be readily done. It is seen, too, that with my construction the blast-box is as nearly air-tight, excepting at the opening in the center of the valve, as it can be made, which is of great advantage in the practical use of the device. In the supply of air any appreciable leakage is a serious objection to the device.

What I claim as my invention, and desire to secure by Letters Patent, is—

1. In a twyer-iron for forges a valve for partially closing the blast-outlet, and a spring that presses against such valve when closed.

2. In a twyer-iron for forges, the combination of a grate, a valve or plate with a central opening in it to close portions of the grate, and a spring that presses against each end of such valve or plate when closed.

3. In a twyer-iron for forges, the combination of a blast-box, a grate thereon, a swinging valve or plate to partially close the grate, a rotatable rod extending through the blast-box beneath the valve, and a spring so mounted on such rod that when the rod is rotated the spring will engage, close and hold the valve.

4. In a twyer-iron for forges, the combination of a blast-box, a grate thereon, a swinging valve or plate to partially close the grate, a rotatable rod extending through the box beneath the valve, and a cam-shaped spring so mounted on the rod that when the rod is rotated the spring will close the valve and hold it tightly closed.

5. In a twyer-iron for forges, the combination of a blast-box with bearing-plates made in its end walls, a grate in the box, a valve or plate with a pivot-rod along one of its edges which is mounted in the box so that the valve when turned into a horizontal position will close the grate, a rod extending through the box under the valve, and springs on the rod that engage, close and hold the valve when said rod is rotated.

In witness whereof I have hereunto set my hand this 27th day of March, 1897.

ALBERT R. THOMPSON.

Witnesses:
V. H. LOCKWOOD,
ZULA GREEN.